Jan. 31, 1928.

O. E. STOKES 1,657,690

AUTOMOBILE FENDER GUARD

Filed April 2, 1925

Witnesses:
William P. Kilroy
Harry P. White

Inventor:
Oscar E. Stokes

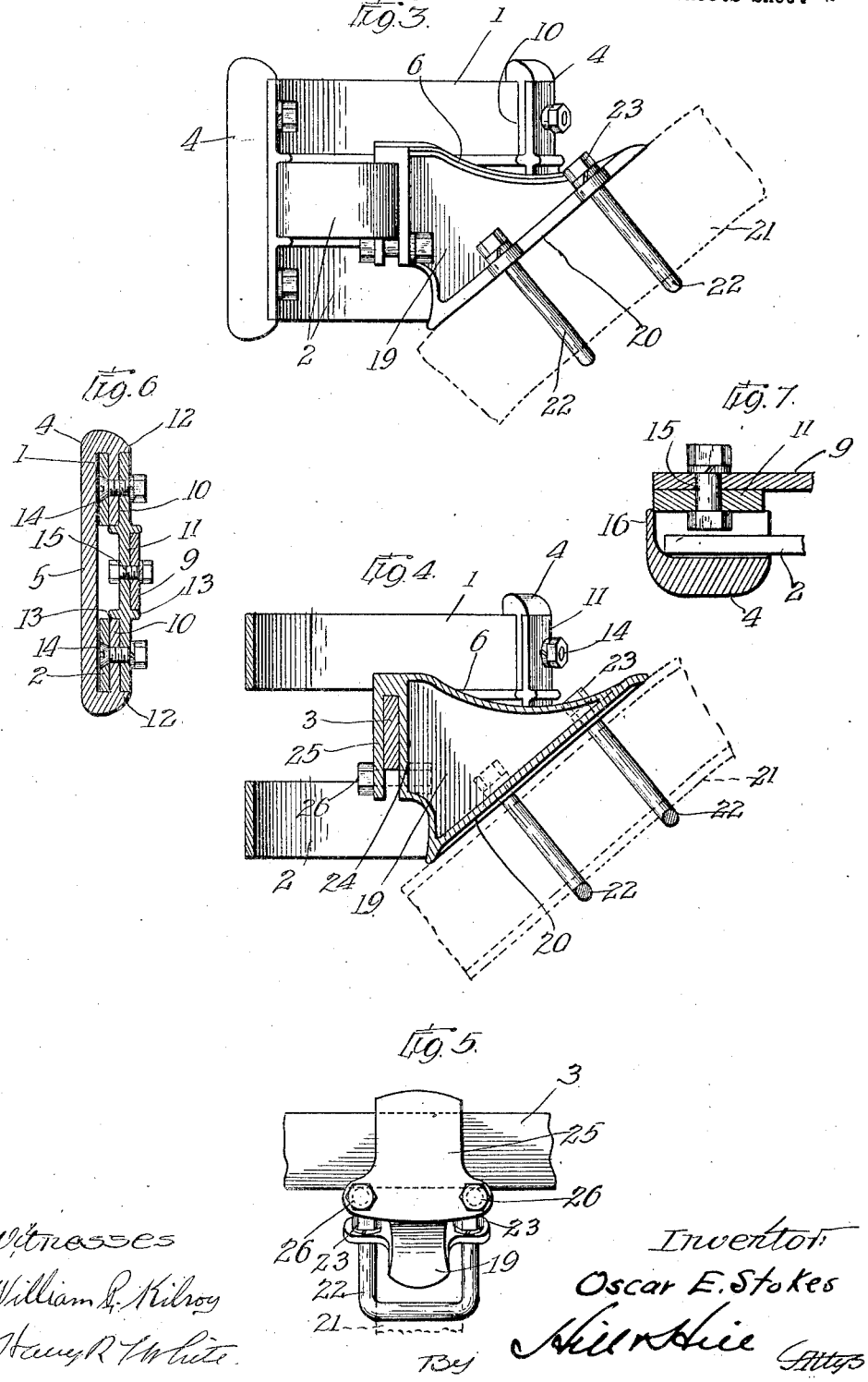

Patented Jan. 31, 1928.

1,657,690

UNITED STATES PATENT OFFICE.

OSCAR E. STOKES, OF STREATOR, ILLINOIS.

AUTOMOBILE FENDER GUARD.

Application filed April 2, 1925. Serial No. 20,194.

My invention belongs to that general class of devices known as bumpers or guards, and relates more particularly to a device adapted to be mounted on an automobile or like vehicle at the rear on either side thereof so as to protect the fenders and body from impact at the rear. The invention has particularly as an object the production of an attractive, light-weight guard which will be resilient or yieldable to some extent and yet rigid and firm enough to perform its function without shock or distortion under ordinary circumstances. Among the objects of the invention is the production of a device of the kind described which is simple, compact, light-weight, of pleasing appearance, durable, adapted for use on various makes of automobiles, and which may be readily attached thereto. The invention has particularly as an object the production of a device that does not require the manufacture of rights and lefts, but which may be interchangeably used on either side. Many other objects and advantages of the construction herein shown and described will be obvious to those skilled in the art from the description herein given.

To this end, my invention consists of the novel construction, arrangement and combination of parts herein shown and described, and more particularly pointed out in the claims.

In the drawings, wherein like reference characters indicate like or corresponding parts;

Fig. 3 is a side elevation looking substantially on line 3—3 of Fig. 2;

Fig. 4 is a sectional view taken substantially on line 4—4 of Fig. 2;

Fig. 5 is a sectional view taken substantially on line 5—5 of Fig. 2;

Fig. 6 is a sectional view taken substantially on line 6—6 of Fig. 1; and

Fig. 7 is a sectional view taken substantially on line 7—7 of Fig. 1.

Figure 1:
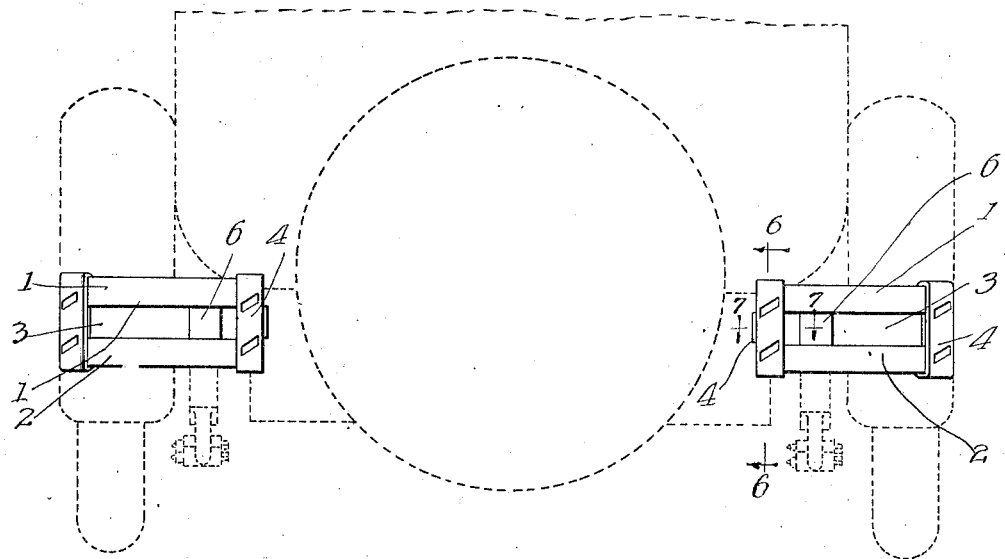
Fig. 1 is a rear elevation of a vehicle shown in dotted lines with a pair of my improved guards attached thereto.
Figure 2:
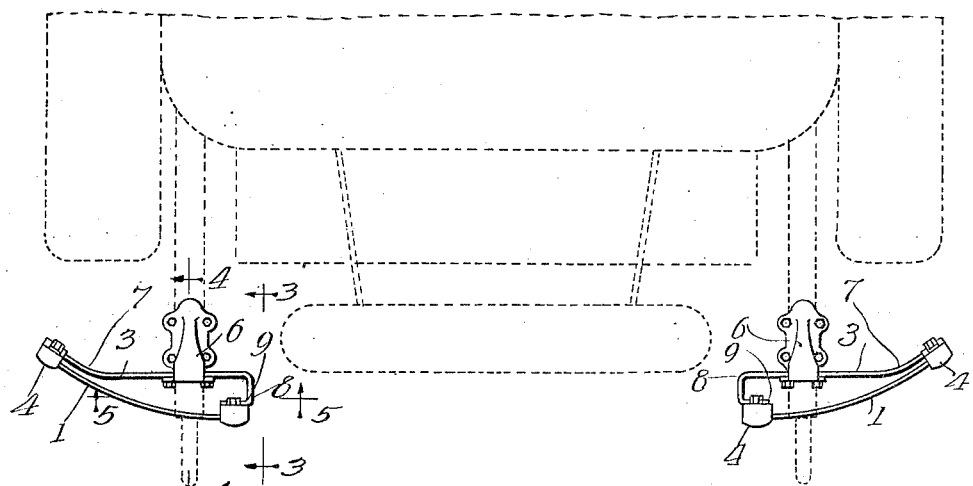
Fig. 2 is a top plan view of the same.

Referring to the drawings, in which only a preferred embodiment of the invention is shown, 1 and 2 represent spaced impact bars which are preferably bent or curved in the form of an arc, as most clearly shown in Fig. 2, these bars being of the desired size, shape and material, preferably of spring metal of considerable strength. There is also provided a supporting bar 3 which is connected with the tie members 4—4 which connect and tie the members or bars 1 and 2 together at their ends. The device is attached to the vehicle frame or other part by means of bracket 6 hereinafter described.

As shown, the supporting bar 3 consists of a straight intermediate portion which is secured to the bracket 6, one end being slightly curved or bent as indicated at 7 for attachment to the outer tie member 4, while the other end is bent laterally as indicated at 8, but in the opposite direction of the other end, and thence back upon itself as indicated at 9, the bar being shaped to best fit the particular make of car upon which the same is to be used.

Members 4—4 are similar and each consists of the body portion 5 which I prefer to form with the portions 10—10 at the ends, extending inwardly toward each other, as most clearly shown in Fig. 6. These members are spaced from the body portion 5 a distance sufficient to permit the positioning of the ends of the bars 1 and 2 between the body and the portions 10. There is provided a plate 11 arrranged to be mounted on the body portion 5, the ends of 5 being preferably formed as indicated at 12 so as to overlie and form a finished appearance. It is preferred to provide the beads or flanges 13 on the plate member 11 at opposite sides, the same being so spaced as to closely fit at one side the ends of the extensions 10 and also engage at the other side with the supporting bar 3 at the sides thereof adjacent its ends, it being understood that one end of 3 is secured to one tie member and the opposite end to the other tie member. The several bars 1, 2 and 3 are secured to the tie members by bolts 14 and 15 or equivalent means for the purpose. It will be noted by referring particularly to Fig. 7 that the tie members 4 are preferably rounded or flanged over at the sides of the body as indicated at 16, so that they are substantially recessed and constructed to provide a finish and make the same more attractive. The ends of the impact bars are seated in these recesses. The bars and tie members may be finished in any suitable way, either japanning, nickel plating or the like.

I prefer to secure each of the guards to the vehicle, as for example the vehicle frame members 21, by brackets 6 before mentioned.

These brackets may be similar, lefts and rights not being necessary, as the same are interchangeable for either side, and as shown consist of a web portion 19 flanged about the same, as shown, and constructed with a base portion 20 arranged to be mounted on the frame and secured thereto by U-bolts 22 and suitable nuts 23 or equivalent means for the purpose. The same is provided with a clamp for the bar 3 consisting of the opposed portions 24 and 25, which are constructed to provide a clamp, 26 being the clamping screw or bolt. The bar 3 is extended in the clamp and then clamped down by the bolts 26, two of which are generally provided for the purpose. The clamp is made of sufficient width to afford a good bearing on the bar so as to prevent the same sagging at either end and to afford a rigid, strong construction. As shown, the bar may rest on the bolts 26. The fitting is so designed that the guard is held in proper position to maintain the bars 1 and 2 in vertical alignment. It is obvious that for different designs of vehicles in which the frame portions 21 are varied in arrangement, the relative angle between the base 20 and the clamping member 24—25 may be varied, so that the bars are held as mentioned. The fitting may be moved up or down on the frame and the guard adjusted in the fitting so as to locate the guard in a desired position relative the vehicle fenders and other parts.

The device described is comparatively light-weight, notwithstanding its extreme rigidity and strength. It is especially attractive in appearance, inasmuch as the ends are enclosed and the construction permits a pleasing design. The bar parts are securely locked together in such a manner that they cannot rattle or work loose, nor can either end sag except by distorting the supporting bar or breaking the bracket. In the case of a blow being struck on the guard, it is opposed by the two outer bars, as well as the inner bar, that is, opposed by all three, and in such a manner that the parts may yield or spring without any permanent set. At the outer side, a side blow tends to spring or curve the bars 1 and 2, as well as the bar 3, the latter tending to yield at some point between the bracket and the end. At the inner side or end, where there is greater chance for a hard blow being struck, the shock is distributed from the end 9 through the bends to the bracket, the strain on the intermediate portion adjacent the bracket being relieved to some extent by the absorption of the shock in the end portion. This tends to prevent any serious distortion of the support 3 at either side of the bracket or injury to the bracket. It will be noted that by making straight the intermediate portion which passes through the bracket, the guard may be adjusted in or out as desired. This is a desirable feature, as different users may desire different adjustments, depending upon the equipment carried at the rear of the car.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In a device of the kind described and in combination, a resilient bumper consisting of a plurality of spaced parallel bars, means for securing the ends and tying said bars together at their free ends each including a recessed tie member and cooperating plate secured thereto, a supporting bar arranged on one side of said bars, said bar secured to said plates and connecting said tying means, and means for securing said supporting bar to a vehicle frame with the spaced parallel bars arranged one above the other, with their impact faces in the same vertical plane.

2. In a vehicle fender guard of the kind described and in combination, a plurality of spaced impact bars, tie members, said tie members recessed to receive the ends of said impact bars, a plate mounted on each of said tie members, means for securing said impact bars, tie members and plates together, a supporting bar and means for securing said supporting bar to said plates, and means for attaching said supporting bar to the vehicle.

3. In a vehicle fender guard of the kind described, a plurality of spaced curved impact bars, a pair of tie members, said tie members recessed to receive the ends of said impact bars and arranged one at each end thereof, a plate mounted on each of said tie members, means for securing said impact bars, tie members and plates together to provide a unitary structure, a resilient supporting bar and means for securing the ends of said supporting bar to said plates, and means for attaching said supporting bar to the vehicle, with the impact bars lying in the same vertical plane.

4. In a vehicle fender guard of the kind described and in combination, a plurality of tie members, each recessed from one side and having an opening on an adjacent side into the recess, impact bars connecting said tie members and arranged with their ends seated in said recesses at either side of the last-mentioned opening, a plate mounted on said side and covering said last-mentioned opening, said plate provided with lugs for engaging at opposite sides of said last-mentioned opening and with spaced lugs at the opposite side, means for securing said plates, tie members and impact bars together, a supporting bar having its ends attached to said plates between said spaced lugs, and means for adjustably attaching said supporting bar to a vehicle frame including a fitting constructed to clamp said supporting bar intermediate the ends thereof and provided with a portion constructed to conform to the vehicle frame, and fastening means for securing the same to said frame.

5. A device of the character described including an impact bar, a supporting bar having its ends bent in opposite directions, means for connecting the ends of the bars together at the bends of the ends of the supporting bar spacing the impact bar and supporting bar a greater distance apart at one end than the other, said impact bar being carried solely by said supporting bar, and means for connecting the supporting bar to the vehicle, said supporting bar being supported solely from one point on the vehicle.

6. A device of the character described including a longitudinally curved impact bar, a supporting bar, means for connecting the supporting bar to a vehicle, the outer end of the supporting bar being curved inwardly towards the vehicle to extend parallel with the outer end of the impact bar and the opposite end being bent at right angles away from the vehicle, and means for connecting together the ends of the impact bar and the supporting bar.

7. In a vehicle fender bar of the character described and in combination, a supporting bar having its ends bent in opposite directions, spaced arcuate impact bars, tie members connecting the ends of the impact bars to the ends of the supporting bar, and means for attaching the supporting bar to a vehicle.

In testimony whereof, I have hereunto signed my name.

OSCAR E. STOKES.